Patented May 30, 1950

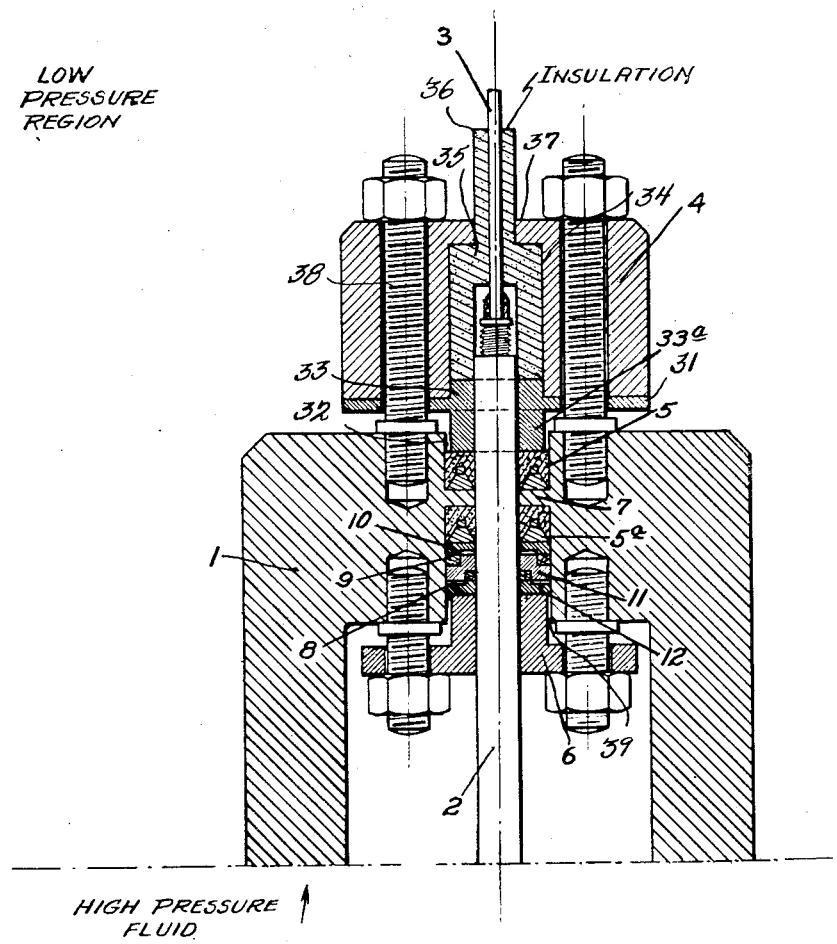

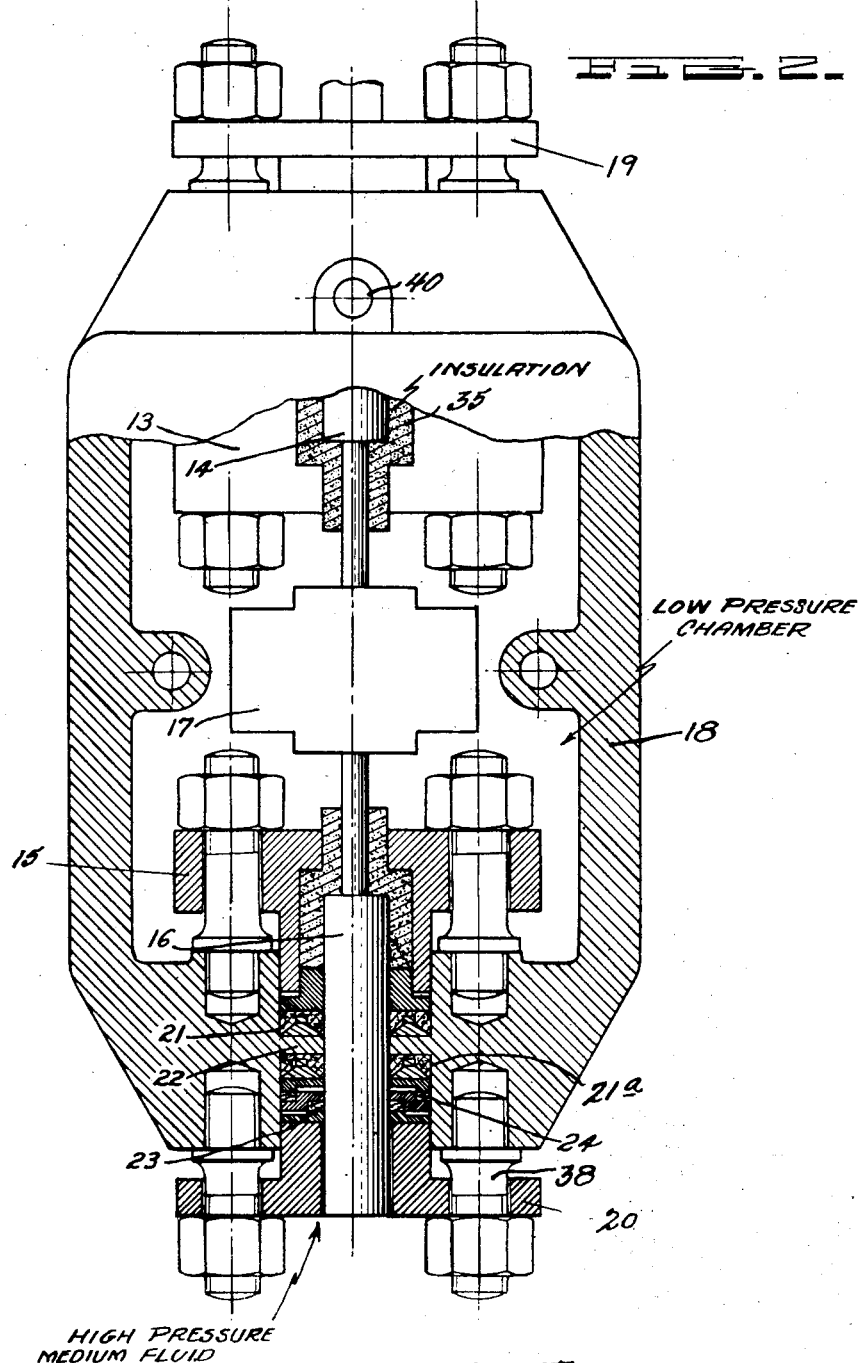

2,509,523

UNITED STATES PATENT OFFICE 2,509,523

INSULATING HEAD FOR ELECTRIC CABLES UNDER HIGH PRESSURE

Georges Pouzet, Paris, France, assignor to Compagnie Generale D'Electricite, Paris, France, a corporation of France Application April 27, 1946, Serial No. 665,372
In France December 21, 1943

7 Claims. (Cl. 174—19)

The present invention concerns improvements in or relating to an isolating head or bushing unit according to my patent application Serial No. 654,988, filed March 16, 1946, for electric cables under high pressures, in which the tightness is achieved by the combined effect of a joint resting on the insulation of the cable and of a cap resisting the pressure, and it is characterised in that the joint is of a special design and form which enables it to be deformed under the pressure, and includes one or more joints providing the tightness, while the continuity of the insulation at the passage from the zone under high pressure to the zone under low pressure is secured by an insulating bushing enclosing the cable tightly and fitting in the cap which resists the pressure.

In a unit of this kind, if the pressure of the fluid under high pressure attains very high values, the number of the superposed annular pieces which form the joint must be increased. For this reason, the initial pressure of the joint by means of the cap may be insufficient to deform all annular pieces, especially those of the annular pieces which are furthest from the cap; the initial tightness of a part of the joint is, therefore, not achieved, and the useful effect of the joint is reduced at the time of the application of the high pressure.

In that case the plastic material forming the annular pieces of the joint must be of a very hard quality. It therefrom results that during the placing of the joint under pressure the annular pieces are not sufficiently deformable at the low pressures to secure a complete tightness before the application of the full pressure.

The present invention aims at an improvement of the tightness of the insulating device according to my said patent application Serial No. 654,988.

The isolating head forming the object of the present invention and corresponding to that described in the main patent is characterised in that it includes on the side opposite the pressure resisting cap a supplementary stuffing-box or boxes protecting the tightness.

The accompanying drawings show two embodiments of the invention by way of example only.

Fig. 1 is a sectional view of an insulating head according to the present invention which is used as a terminal.

Fig. 2 is an exterior view partially in section of a housing according to the present invention for the connection of two submarine cable portions to include an auxiliary transducing apparatus such as a repeater.

As illustrated in Fig. 1, 1 is the wall of a sleeve traversed by the cable which separates the fluid under high pressure from the space under lower pressure, 2 is the cable covered with its insulation, 3 is the conductor of the cable, 4 is the pressure resisting cap, 5 the packing joint consisting of superposed annular pieces, such as described in my said co-pending application. For reason of clearness in the drawing the joint 5 is shown as only comprising a restricted number of annular washers.

Cap 4 is attached to wall member 1 by bolts 38. Insulating bushing member 35 has a restricted portion 36 tightly received in an aperture in the top 37 and in the central bore 34 of cap 4. A plate member 31 fits against cap 4 and has an upwardly projecting shoulder 33 which fits within bore 34 in cap 4 and abuts the end of insulating bushing member 35, and also has a downwardly projecting collar 33a which extends into the cylindrical recess 32 in wall member 1 in which packing joint 5 is received and bears against the latter.

In order to facilitate a uniform compression of the joint 5 over its whole height before the application of the pressure, a second joint 6 such as a stuffing box situated opposite the pressure resisting cap 4 is provided in accordance with the present invention and has a portion which fits in bore 39 in wall member 1. In this manner, by a suitable tightening of the pressure resisting cap 4 and of the supplementary stuffing box 6, the same initial compression is transmitted to the various annular pieces forming the joint.

On the other hand, in order to enable the pressing of the pieces 4 and 6 independently of each other, the annular chamber containing the packing joints 5 has been illustrated as divided by an intermediate wall 7 serving as an abutment for the packing joints when tightening pieces 4 and 6.

Finally, according to the present invention, provision is made to equip the joint on the side where the pressure of the high pressure fluid is applied, with joints providing the tightness, formed of an easily deformable material serving to secure the tightness at low pressures until the annular pieces of the packing joint 5 of a material more difficult to deform, are subjected to the effect of the full heavy pressure. 8 denotes the protective joint intended to protect the leakage path on insulation. 9 is the protective joint intended to protect the leakage path on the inner surface of the wall of sleeve 1. In order to increase the pressure exercised on these protective joints when tightening of the stuffing box 6 these joints are fitted in annular metal pieces such as 10, 11 and 12 in such a manner that the tightening of each joint is independent of the tightening of another joint.

The improvements according to the invention are not only applicable to a terminal device, such as described above, but also for the interposition in submarine cables of transducer units placed at a certain depth or on the bottom of the sea, as will be described hereinafter.

In such an arrangement as illustrated in Fig. 2, 13 is the cap of the isolating head mounted on the cable 14, 15 is the cap of another isolating head mounted on the cable 16 which is to be connected to the cable 14 through an auxiliary apparatus or transducer 17. The caps 13 and 15 are fixed on the pressure resisting water tight sleeve 18 in the interior of which is placed the auxiliary apparatus or transducer. A junction box of this kind has already been described in my said co-pending application. According to the present invention, 19 and 20 are the supplementary stuffing boxes permitting homogeneous tightening of the joints 21 together with the caps 13 and 15 to be secured. 22 is the intermediate wall of the annular chamber containing the packing joints. 23 and 24 are the joints providing the tightening of the isolating head of the cable 16 intended to secure the tightness at low pressures. The cable 14 is provided with the same devices, but not illustrated.

Obviously, the supplementary stuffing boxes may assume other forms than that shown in Figs. 1 and 2, and also the design of the protecting joints may be different from that illustrated in these figures. Further, one and the same joint may serve as guard for the leakage paths on the surface of the insulation of the cable and on the internal surface of the wall of the sleeve, or several successive guarding joints may be provided, each of these joints being common or not to the leakage paths to be protected, whether fitting together or not.

On the other hand, it will be well understood that the use of the supplementary stuffing box and of the joints guarding the tightness for low pressures may, or may not be, combined.

I claim:

1. In an isolating bushing unit for an insulated electric cable traversing a wall separating a zone of high fluid pressure from a zone of low fluid pressure, a separating wall unit apertured for the passage therethrough of said cable and its insulation, said wall unit being provided with a cylindrical recess extending concentrically with said cable from the low pressure side of said wall unit a fractional part of the thickness of said wall unit and terminating in a transverse terminal inner face, a high pressure resistant cap having a central cylindrical bore, means for fixedly mounting said cap on the low pressure side of said wall unit and spacedly surrounding said cable, the top of said cap being provided with a restricted aperture of smaller diameter than its said bore for the passage of said cable therethrough, an intermediate plate member interposed between said wall unit and said cap and having a collar adapted to tightly fit into said recess and being centrally apertured for the passage of the cable therethrough, said bore of said cap being closed at one end by said intermediate plate member, an insulating bushing fitting in said bore of said cap surrounding said cable and having a portion projecting through said restricted aperture of the top of said cap to the zone of low fluid pressure, a principal high pressure deformable unit fitting into said recess in said wall unit between the inner face of said recess and the end of said collar, said wall unit being provided with a cylindrical bore extending concentrically with said cable from the high pressure side of said wall unit toward but not reaching said recess in said wall unit, said wall unit comprising an integral transverse partition separating said bore of said wall unit and said recess and having one of its faces constituting the terminal inner face of said recess, and a stuffing box mounted on said wall unit surrounding said cable and extending into said bore in said wall unit from the high pressure side thereof.

2. An isolating bushing unit according to claim 1, and an auxiliary high pressure deformable unit fitting into said bore in said wall unit between the partition inner face of said bore and said stuffing box.

3. An isolating bushing unit according to claim 1, and a low pressure readily deformable unit fitting into said bore in said wall unit between the partition inner face of said bore and said stuffing box.

4. An isolating bushing unit according to claim 1, and an auxiliary high pressure deformable unit fitting into said bore in said wall unit in engagement with the partition inner face of said bore, and a low pressure readily deformable unit fitting into said bore in said wall unit between said auxiliary high pressure deformable unit and said stuffing box.

5. An isolating bushing unit according to claim 1, and an auxiliary high pressure deformable unit fitting into said bore in said wall unit in engagement with the partition inner face of said bore, and a low pressure readily deformable unit fitting into said bore in said wall unit between said auxiliary high pressure deformable unit and said stuffing box, said low pressure unit comprising packing rings respectively engaging the bore of said wall unit and the insulation of said cable, and annular metal pieces surrounding said cable and having peripheral notches wherein said packing rings are received.

6. In a submarine cable connecting box unit, a closed box adapted to withstand high external pressure when its internal pressure is low, a pair of cable ends to be connected, electrical connecting means mounted within said box and connecting together the conductors of said cable ends, said box unit having two terminal separating wall units, each said separating wall unit being apertured for the passage therethrough of a said cable end and its insulation, each said wall unit being provided with a cylindrical recess extending concentrically with said cable from the low pressure side of said wall unit a fractional part of the thickness of said wall unit and terminating in a transverse terminal inner face, a high pressure resistant cap having a central cylindrical bore, means for fixedly mounting said cap on the low pressure side of said wall unit and spacedly surrounding said cable, the top of said cap being provided with a restricted aperture of smaller diameter than its said bore for the passage of said cable therethrough, an intermediate plate member interposed between said wall unit and said cap and having a collar adapted to tightly fit into said recess and being centrally apertured for the passage of the cable therethrough, said bore of said cap being closed at one end by said intermediate plate member, an insulating bushing fitting in said bore of said cap surrounding said cable and having a portion projecting through said restricted aperture of the top of said cap to the zone of low fluid pressure, a principal high pressure deformable unit fitting into said recess in said wall unit between the inner face of said recess and the end of said collar, said wall unit being provided with a cylindrical bore extending concentrically with said cable from the high pressure side of said wall unit toward but not reaching said recess in said wall unit said wall unit comprising an integral transverse partition separating said bore of said wall unit and said recess and having one of its faces constituting the terminal inner face of said recess, and a stuffing box mounted on said wall unit surrounding said cable and extending into said bore in said wall unit from the high pressure side thereof, and an auxiliary high pressure deformable unit fitting into each said wall unit between the partition inner face of said bore and said stuffing box.

7. A connecting box unit according to claim 6, said electrical connecting means comprising an electrical transducer for acting on the current applied thereto.

GEORGES POUZET.

REFERENCES CITED

The following references are of record in the file of this patent:

UNITED STATES PATENTS

| Number | Name | Date |
| --- | --- | --- |
| 1,610,442 | Gorton | Dec. 14, 1926 |
| 1,677,126 | Dennis | July 17, 1928 |
| 2,211,122 | Howard | Aug. 13, 1940 |
| 2,356,351 | Phillips | Aug. 22, 1944 |